July 24, 1962 R. N. RHODES ETAL 3,046,335

NOISE PROTECTION CIRCUIT FOR TELEVISION RECEIVERS

Filed Nov. 24, 1959 3 Sheets-Sheet 1

INVENTORS
ROLAND N. RHODES &
JACK AVINS
BY W. H. Sprague
ATTORNEY

NOISE PROTECTION CIRCUIT FOR TELEVISION RECEIVERS

INVENTORS
ROLAND N. RHODES &
JACK AVINS
BY W. J. Sprague
ATTORNEY

NOISE PROTECTION CIRCUIT FOR TELEVISION RECEIVERS

Filed Nov. 24, 1959 3 Sheets-Sheet 3

INVENTORS
ROLAND N. RHODES &
JACK AVINS
BY V. H. Sprague
ATTORNEY

United States Patent Office 3,046,335

Patented July 24, 1962

3,046,335
NOISE PROTECTION CIRCUIT FOR TELEVISION RECEIVERS

Roland N. Rhodes, Levittown, Pa., and Jack Avins, New York, N.Y., assignors to Radio Corporation of America, a corporation of Delaware Filed Nov. 24, 1959, Ser. No. 855,186
9 Claims. (Cl. 178—7.3)

This invention relates to noise protection circuits for television receivers, and more particularly to circuits for reducing the deleterious effects of noise in a received television signal on the synchronizing and automatic gain control circuits of television receivers.

In order that the image represented by the video-modulated, radio frequency signals received by a television receiver can be properly reproduced, it is necessary that the scanning circuits for the kinescope of the receiver be synchronized with the scanning circuits associated with the image pick-up device of the transmitter. Synchronization is accomplished, as is well known, by transmitting a synchronizing signal for both the horizontal and vertical scansions of the kinescope of the receiver as a part of the television signal. If noise is present in the television signal, it may affect the synchronizing circuits, and cause a lack of synchronization to exist between the transmitted and reproduced images. Additionally, noise in the received television signal may cause the generation of an incorrect automatic gain control voltage for the receiver and thus cause improper amplification of the received signal.

It is, therefore, an object of this invention to provide an improved noise protection circuit for the synchronizing or automatic gain control circuits, or both, of a television receiver.

It is another object of this invention to provide an improved circuit for the generation of a noise cancelling or inverting signal for application to the synchronizing or automatic gain control circuits, or both, of a television receiver to substantially cancel the effects on such circuits of noise signal which may be present in a television signal.

It is a further object of the invention to provide an improved noise protection circuit for the synchronizing and automatic gain control circuits of television receivers that utilizes a minimum number of parts, in addition to those already present in known receivers, and which is economical of construction and reliable and efficient in operation.

These and other objects of the invention are accomplished, briefly, by providing a keyed automatic gain control (AGC) circuit for a television receiver which utilizes an AGC tube of the pentode type. A composite television signal, which is detected from received television signals, includes synchronizing signal components and video or image defining signal components and may include noise signal components, is applied between the control grid and cathode of the tube. The anode of the tube is keyed by a voltage pulse to allow anode current conduction substantially only during the interval that the synchronizing signal components are applied to the tube and to develop an AGC voltage representative of the amplitude of the signal during the synchronizing interval. The control grid voltage—screen grid current—transfer characteristic is utilized to provide separated negative going noise signals across a load impedance in the screen grid circuit. These are developed across the load impedance during both the video and synchronizing intervals provided the noise signals are greater in amplitude than the synchronizing signals, and are applied to a synchronizing signal separator circuit of the receiver where they serve to invert the composite television signal that is applied separately to the separator circuit. The separated noise signals at the screen grid may also be applied to the suppressor grid of the AGC tube to prevent the generation of an incorrect AGC voltage when noise components are present in the composite television signal.

The invention may be better understood, however, when the following description is read in connection with the accompanying drawings, in which like reference numerals refer to corresponding parts throughout the various figures of the drawings, and in which.

Figure 1:
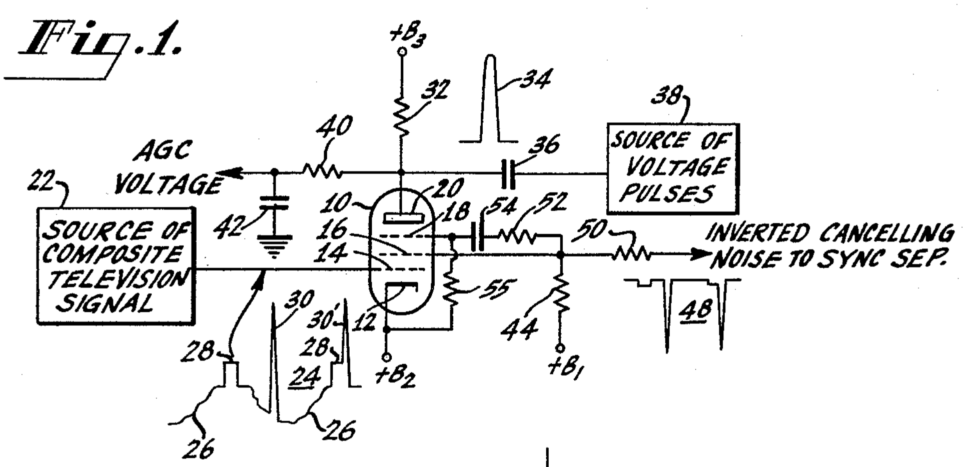
FIGURE 1 is a schematic circuit diagram of an automatic gain control circuit for a television receiver embodying the invention.
Figures 2, 5:
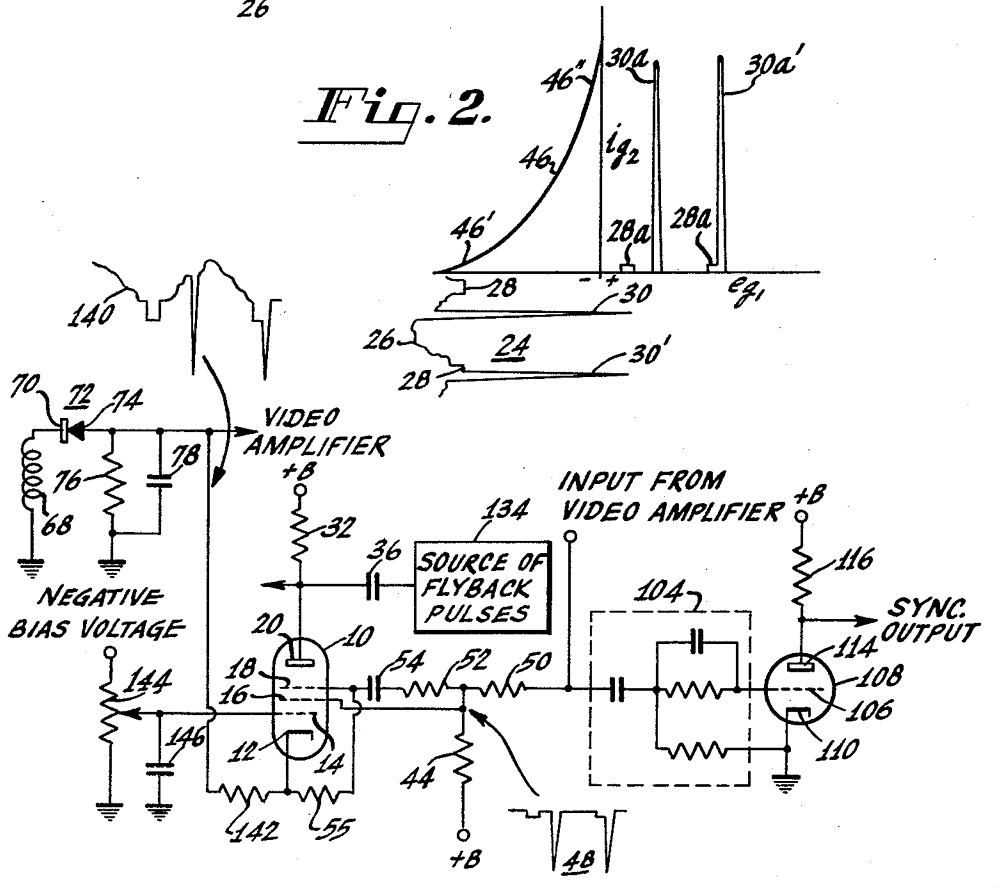
FIGURE 2 is a graph showing curves of certain operational features of the circuit of FIGURE 1.
FIGURE 5 is a schematic circuit diagram of a portion of a television receiver illustrating an additional embodiment of the invention.

Referring now to the drawings and in particular to FIGURES 1 and 2, there is shown in FIGURE 1 an AGC tube 10, such as may be used in television receivers, which includes a cathode 12, a first control grid 14, a screen grid 16, a second control grid 18, and an anode 20. A positive going composite television signal from a source of television signal 22, is applied to the first control grid 14 of the tube 10. A negative going composite television signal is one in which the synchronizing signal components are more negative than the video signal components, and a positive going composite television signal is one in which the synchronizing signal components are more positive than the video signal components. As illustrated by the waveform 24 shown in the figure, the composite television signal 24 includes video or image defining signal components 26 and synchronizing signal components 28, which occur, respectively, during mutually exclusive, regular recurring intervals, and noise signal components in the form of noise pulses 30 and 30′, which may occur randomly during the television signal. It will be noted that a first noise pulse 30 has been illustrated as occurring during the video signal component interval, and a second noise pulse 30′ has been illustrated as occurring during the synchronizing signal component interval.

The anode 20 of the AGC tube 10 is connected to a source of operating potential, $+B_3$, through an anode load resistor 32, and the cathode 12 is connected directly to a second source of operating potential, $+B_2$. The voltage value of the source $+B_3$ is determined by the AGC distribution network and may be positive, zero, or even negative. Coincident with the synchronizing signal component interval of the composite television signal 24, a voltage pulse, illustrated by waveform 34, is applied to the anode 20 through a coupling capacitor 36 from a source of voltage pulses 38. The magnitude of the current that flows in the anode 20 during the occurrence of each pulse 34 is dependent upon the amplitude of the signals on the first control grid 14 during the pulse interval, which is normally the amplitude of the synchronizing signal components 28. A unidirectional voltage is developed across the anode load resistor 32 which is indicative of the amplitude of the synchronizing signal components 28. This unidirectional voltage is filtered by filter resistor 40 and filter capacitor 42 and serves as the AGC voltage. Noise signal components have not been considered in this explanation, but if they are present during the interval of the synchronizing signal components they will tend to cause an excessive anode current flow and develop an incorrect AGC voltage, as will be more adequately explained hereinafter.

As thus far described, the AGC circuit of FIGURE 1 is well known and has been used in commercial television receivers. In such well known circuits, however, the screen grid 16 of the tube is bypassed to ground so that no significant signals are developed in the screen grid circuit, and the second control grid 18 is directly connected to the cathode 12 so that it is a passive suppressor electrode. In accordance with the invention, a noise signal load circuit is provided by a screen load resistor 44 connected between the screen grid 16 and a source of operating potential, $+B_1$. Signals on the first control grid 14 will cause output signals to be developed across the screen load resistor 44, as well as AGC output signals across the anode load resistor 32. Note, however, that signals can only be developed at the anode 20 when a voltage pulse 34 is applied thereto, while signals may be developed at all times at the screen grid 16, dependent only upon the signals on the first control grid 14.

The first control grid-to-screen grid transconductance characteristics are illustrated as curve 46 in FIGURE 2, which is a plot of the voltage on the first control grid 14 ($e_{g1}$) against the current in the screen grid 16 ($i_{g2}$). Below the abscissa of the curve 46 the composite television signal 24 applied to the first control grid 14 is illustrated, and to the right of the ordinate the screen current output signals corresponding to the input composite television signal on the control grid 14 are illustrated. It will be seen that the synchronizing signals components 28 of the composite television signal 24, while they are themselves substantial in amplitude, cause the first control grid-to-screen grid portion of the tube 10 to operate on the lower portion 46′ of its characteristics and produce relatively small pulses 28a of screen grid current. The video signal components 26 fall below screen current cut-off and produce substantially no current in the screen grid 16. The first noise pulse 30, however, tends to drive the tube 10 so that the first control grid-to-screen grid circuit operates on the upper portion 46″ of its characteristics and produces an output pulse of screen current, which is illustrated as pulse 30a. In like manner, the second noise pulse 30′ produces a pulse of screen current, which is illustrated as pulse 30a′. Thus, it will be seen that noise signal components on the first control grid 14 of the AGC tube 10 which exceed the amplitude of the synchronizing signal components 28 produce noise signal currents in the screen grid 16, which, in turn, develop negative going noise signals 48 (as illustrated in FIGURE 1) across the screen load resistor 44 to the virtual exclusion of the remainder of the composite television signal. Note that signals 28a responsive to the synchronizing pulses 28 do appear at the screen grid 16. The amplitude of these pulses 28a, however, is small enough to be neglected, except for one consideration which will be mentioned hereinafter in connection with FIGURE 4. As is known, such separated noise signals 48 may be applied through a resistor 50 to the synchronizing signal separator circuit of a television receiver to cancel or invert the noise which is present in the composite television signals separately applied to the separator circuit that would normally tend to cause an incorrect generation of synchronizing information.

The separated noise signals 48 available at the screen grid 16 are also, in accordance with the invention, applied through a coupling resistor 52 and coupling capacitor 54 to the second control grid 18 of the AGC tube 10. The second control grid 18 is returned to the cathode 12 by a resistor 55 connected between the second control grid 18 and the cathode 12. Note that, in the absence of a voltage pulse 34 at the anode 20, the first noise pulse 30 has no substantial effect on the AGC voltage developed, since the first noise pulse 30 occurs during an interval when no voltage pulse 34 is applied to the anode 20 of the tube 10, and thus no anode current can flow. The second noise pulse 30′, however, occurs during the synchronizing portion 28 of the composite television signals 24, and during this time, the anode 20 is pulsed and the anode current that flows is dependent upon the amplitude of the signals appearing on the first control grid 14. The signals on the first control grid 14 are normally, during the pulsed period, the synchronizing signal components 28, but if a noise signal component, however, such as a second noise pulse 30′, is riding on the synchronizing signal component 28, it will be seen that in the absence of the present invention, an incorrect AGC voltage would be developed. The amount that the AGC voltage is incorrect will be determined by the amplitude and time duration of the second noise pulse 30′. In accordance with this invention, however, the effect of the noise pulse 30′ is counteracted by the separated noise pulse, such as shown in waveform 48, applied to the second control grid 18, which gates off the anode current and the deleterious effect of the noise pulse 30′ on the amount of AGC voltage developed is substantially or completely cancelled.

Figure 3:
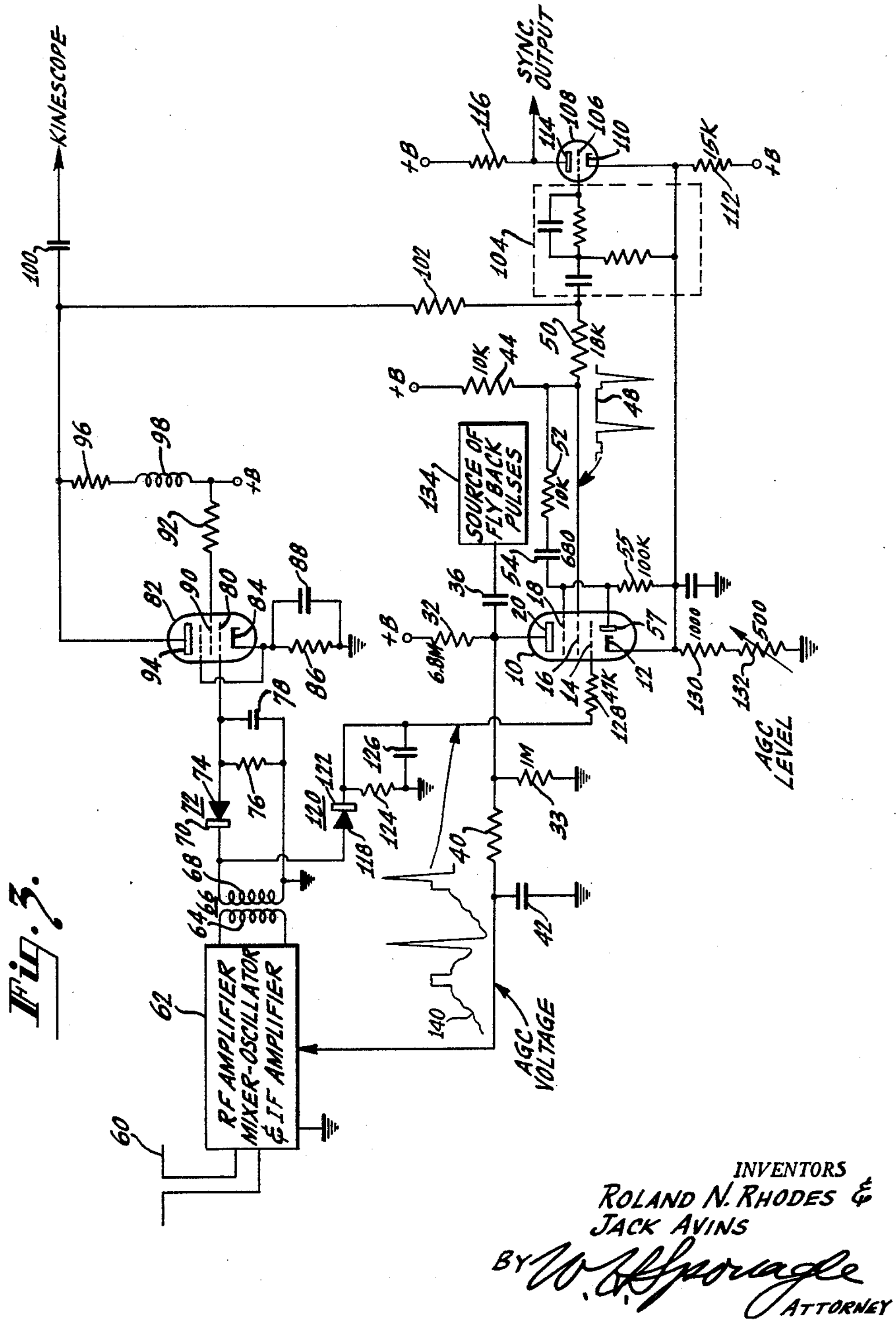
FIGURE 3 is a schematic circuit diagram of a portion of a television receiver illustrating another emobdiment of the invention.

Referring now to FIGURE 3, portions of a television receiver that are concerned with the invention are illustrated and include an antenna 60 to intercept a radio frequency television signal and apply it to the radio frequency amplifier, mixer-oscillator, and intermediate frequency amplifier sections of the receiver which are indicated by the block 62 and which may be of well known design. An intermediate frequency television signal is thus developed across the primary winding 64 of an intermediate frequency transformer 66, in the usual and known manner. The secondary winding 68 has one terminal connected to ground for the receiver and the other terminal connected to the cathode 70 of a video detector diode 72. The anode 74 of the video detector diode 72 is connected to ground through a video detector load circuit comprising a video detector load resistor 76 connected in parallel with a video detector load capacitor 78. The detected composite television signal (which is a negative going signal) is developed at the video detector diode anode 74, across the video detector load circuit, and is applied directly to the control grid 80 of a video amplifiier 82. Bias is supplied to the video amplifier 82 by connecting its cathode 84 to ground through a bias resistor 86 which is shunted by a high frequency peaking capacitor 88. Operating potential is supplied to the screen grid 90 through a screen resistor 92 from a source of operating potential, +B, and to the anode 94 through a video load resistor 96 and a high frequency peaking coil 98 from the same source of operating potential, +B. An amplified positive going composite television signal appears at the anode 94, across the load resistor 96 and the high frequency peaking coil 98, and is applied through a coupling capacitor 100 to the kinescope of the receiver, which has not been illustrated in the interest of simplicity, since it forms no part of the invention.

A composite positive going television signal is also applied from the anode 94 of the video amplifier 82 through a coupling resistor 102 and a coupling network 104 to the control grid 106 of a synchronizing signal separator tube 108. The cathode 110 of the separator tube 108 is connected through a cathode resistor 112 to the source of operating potential, +B, and the anode 114 is connected through a separator load resistor 116 to the source of operating potential, +B. As is known, the separator tube 108 is biased to conduct only during the synchronizing interval of the composite television signal applied to its control grid 106 and separated synchronizing signals are available at its anode 114 (labeled on the drawing "Sync Output").

The portions of the television receiver, as thus far described, are of well known design and have been used in commercial television receivers. Other portions of known television receivers, such as the sound and deflection circuits, have not been illustrated, since they form no part of the invention.

Note particularly that the video detector diode 72 is connected to provide a negative going composite television signal at the control grid 80 of the video amplifier 82 which will, in turn, provide a positive going composite television video signal at the anode 94. Thus, a positive going composite television signal is applied to the control grid 106 of the separator tube 108.

In accordance with the invention, the anode 118 of an auxiliary detector diode 120 is connected to the cathode 70 of the video detector diode 72 to receive the intermediate frequency television signal at its anode 118. The cathode 122 of the auxiliary detector diode 120 is connected to ground through an auxiliary load circuit comprising a load resistor 124 in parallel with a load capacitor 126, and a positive going composite television signal is developed thereacross. The positive going composite television signal is applied through a coupling resistor 128 to the first control grid 14 of an AGC tube 10, such as was described in connection with FIGURE 1. The cathode 12 of the AGC tube 10 is connected to ground through a limit resistor 130 and a variable resistor 132 (which is labeled on the drawing "AGC level"). The cathode 12 of the tube 10 is also connected directly to the cathode 110 of the separator tube 108 and, as can be seen from the drawing, the separator cathode resistor 112, the limit resistor 130, and the variable resistor 132 provide a voltage divder across the source of operating potential, +B, to set the voltage on the cathode 12 of the AGC tube 10 and the cathode 110 of the separator tube 108.

The remaining circuitry associated with the tube 10 is essentially the same as described in connection with the circuit of FIGURE 1. Briefly, the screen grid 16 of the AGC tube 10 is connected to the source of operating potential, +B, through a screen load resistor 44, and is connected to the second control grid 18 of the tube 10 through a coupling resistor 52 and coupling capacitor 54. The anode 20 is connected to the source of operating potential, +B, through the AGC load resistor 32 and is connected to ground through a second resistor 33. Selection of the values of the resistors 32 and 33 determines the amount of operating potential supplied to the anode 20. The anode 20 is also connected through the coupling capacitor 36 to a source of flyback pulses 134, which corresponds to the source of voltage pulses 38 described in connection with FIGURE 1. As is known, a convenient source of such pulses is the horizontal deflection circuits of the receiver. The second control grid 18 is returned to the cathode 12 by the resistor 55.

The operation of the AGC tube 10 in FIGURE 3 is identical with the operation of the AGC tube 10 as described in connection with FIGURE 1. Briefly, a positive going composite television signal is applied to the first control grid 14, which signal may include noise signal components, such as the first and second noise pulses 30 and 30' as described in FIGURE 1. The source of flyback pulses 134 supplies voltage pulses to the anode 20 during the flyback pulse interval, which occurs concurrently with the synchronizing interval, to develop an AGC voltage at the anode 20 of the AGC tube 10. The AGC voltage is applied through the filter resistor 40 and across the filter capacitor 42 to the RF and IF amplifier circuits of the receiver, schematically illustrated in block 62.

As described in connection with FIGURE 1, separated noise signals which are available at the screen grid 16 are applied through the coupling resistor 50 and the coupling circuit 104 to the control grid 106 of the separator tube 108. Thus, positive going noise signal components that may be present in the composite television signals separately applied from the video amplifier 82 to the separator tube 108 are substantially or completely inverted by the negative going separated noise signals developed across the screen load resistor 44 of the AGC tube 10.

Variation of the value of the "AGC level" resistor 132 controls the bias valtage on the cathode 12 of the AGC tube 10. This method of controlling the bias level of the cathode of a keyed AGC tube is well known and serves to determine the reference level of the detected composite television signal at the video detector. Note also that the cathodes 12 and 110 of the tubes 10 and 108 are connected together and that the separator tube 108 is biased by the same voltage that biases the AGC tube 10. This connection has the practical advantage of allowing the two tubes 10 and 108 to be built into a common tube envelope utilizing the conventional nine pin miniature tube socket.

It will be observed that the separated noise signals which are developed at the screen grid 16 are coupled through a capacitor 54 to the second control grid 18 of the AGC tube 10. Since the separated noise signals are A.C. coupled to the grid 18, the bias on the second control grid 18 will assume a value which is equal to the average value of the noise signals applied thereto. It is thus possible that small noise signals, which may occur near large noise signals, will not drive the second control grid 18 negative, or sufficiently negative, to provide cancellation of the small noise signals in the AGC circuit. If the potential of the second control grid 18 is clamped to substantially that of the cathode 12 so that the second control grid potential cannot become more positive than the cathode potential, both large and small noise signals provide effective noise inversion. This clamping may be accomplished, as shown in FIGURE 3, by utilizing an auxiliary diode plate 57 within the envelope of the tube 10 which utilizes the cathode 12 as its cathode. The diode plate 57 is connected directly to the second control grid 18 and serves to clamp the second control grid voltage to that of the cathode 12. Therefore, both small and large noise signals appearing on the second control grid 18 will drive the grid 18 negative to provide efficient noise cancellation. An external diode may be used in place of the internal diode, if desired.

A circuit was constructed and successfully operated utilizing the component values shown in FIGURE 3 with a type 6DT6 as the AGC tube 10.

Figure 4:
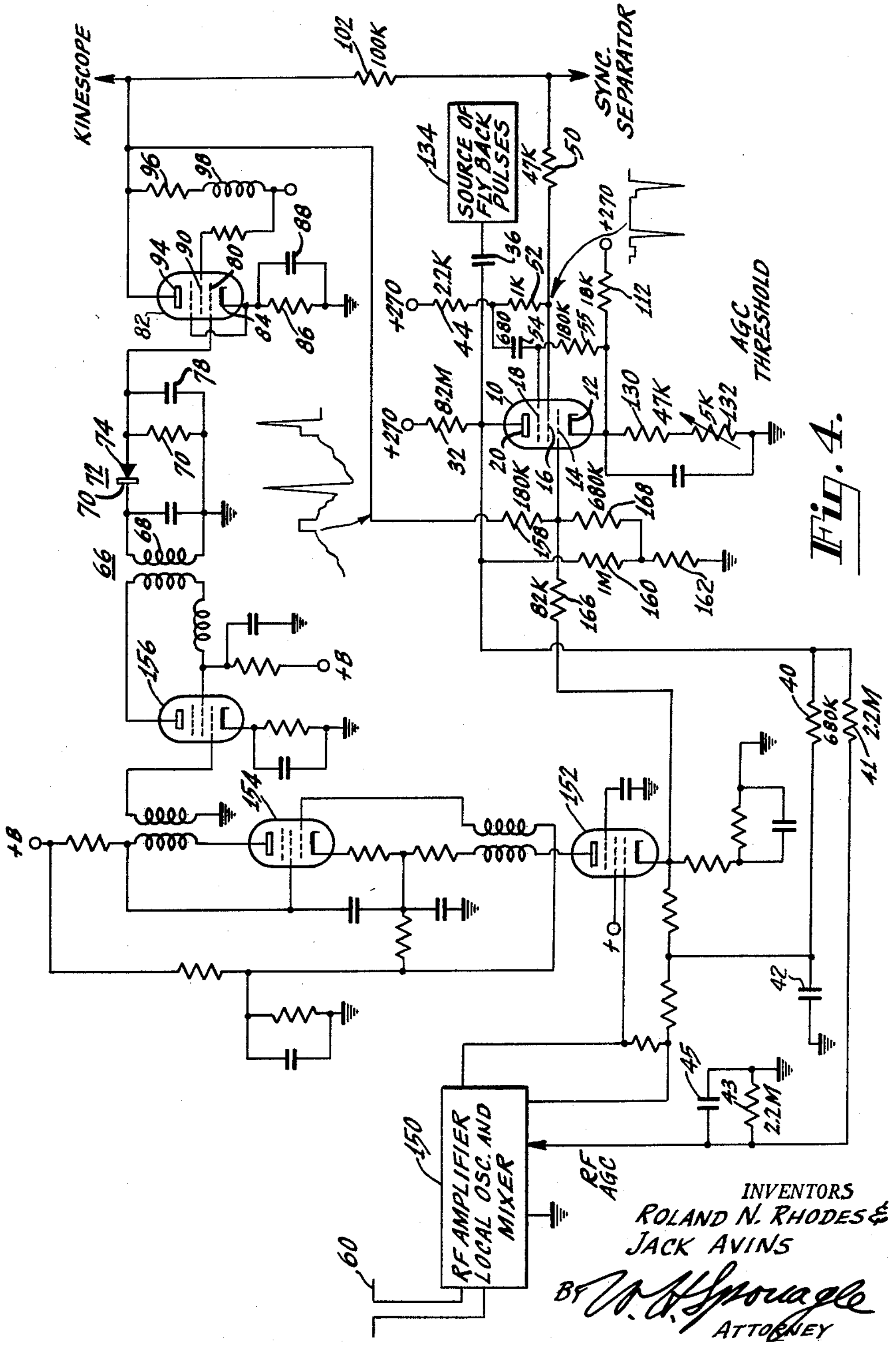
FIGURE 4 is a schematic circuit diagram of a portion of a television receiver illustrating a further embodiment of the invention.

Referring now to FIGURE 4, there is illustrated a schematic circuit diagram of a television receiver which shows an AGC-noise separator circuit in accordance with another embodiment of the invention. The AGC-noise separator circuit shown in FIGURE 4 is essentially the same as the circuit shown in FIGURE 3, but a different source of signal for the AGC tube 10 is shown, and compensation is provided to improve the operation of the circuit below AGC threshold, that is, below the received signal level at which AGC voltage normally is generated.

The television receiver includes an antenna 60 to intercept and supply a radio frequency television signal to a radio frequency amplifier, local oscillator, and mixer 150, which may be of any known design, to develop an intermediate frequency (IF) television signal. The IF television signal is applied to an IF amplifier consisting of first, second, and third IF amplifiers 152, 154, and 156, respectively. More specifically, the IF signal is applied to the control grid of the first IF amplifier tube 152 and derived, after amplification, from the secondary winding 68 of an IF transformer 66 connected in the anode circuit of the third IF amplifier 156. It will be noted that the IF amplifier is of a design which has been used in commercial television receivers.

The secondary winding 68 of the IF transformer 66 is connected to a diode detector 72 in the same manner as described in connection with FIGURE 3. The detected composite television signal is applied, as in the circuit of FIGURE 3, to a video amplifier tube 82, where the composite television signal is amplified and applied directly to the kinescope of the receiver, and to the sync separator tube 108 of the receiver through an isolating resistor 102. An AGC tube 10 is shown and its circuitry is essentially the same as that shown in FIGURE 3. There is, however, one important difference. The input signal of the AGC tube 10 is a positive going composite television signal derived from the anode 94 of the video amplifier tube 82 and applied to the first control grid 14 through a voltage divider network consisting of a coupling resistor 158 and the resistance to ground from the first control grid 14 of the AGC tube 10, whereas in the circuit of FIGURE 3, the input signal to the AGC tube 10 is derived from an auxiliary detector 120.

Basically, the operation of the circuit of FIGURE 4 is the same as that described in connection with FIGURE 3. A positive going composite television signal is derived from the anode 94 of the video amplifier tube 82 and applied through the coupling resistor 158 to the first control grid 14 of the AGC tube 10. The voltage division in the AGC tube input circuit, previously described, reduces the amplitude of the composite television signal applied to the first control grid 14. Under normal operating conditions, that is, with a received signal of sufficient strength to generate an AGC voltage, the operation of the circuit is essentially as described in connection with FIGURE 3.

As the received television signal becomes weaker, however, insufficient composite television signal amplitude is available at the first control grid 14 of the AGC tube to develop AGC voltage, and as a result the noise signals developed at the screen grid 16 corresponding to the weaker noise signals in the composite television signal tend to be reduced in amplitude. Thus, incomplete noise cancelling results at the sync separator. In addition, the noise in the composite television signal applied to the sync separator tube 108 becomes effectively larger because the level at which noise is clipped in the video amplifier 82 (because of anode current saturation) remains the same, even though the composite video signal is decreased. It thus may be necessary to compensate the AGC tube 10 at low signal levels by reducing the bias between the cathode 12 and first control grid 14 of the AGC tube 10 to provide AGC action below normal AGC threshold.

One method of providing compensation to the AGC-noise separator circuit at low signal levels below AGC threshold is shown in FIGURE 4. AGC voltage is applied from the anode 20 of the AGC tube through the filter circuit (resistor 40 and capacitor 42) to the control grid of the first IF amplifier tube 152 and to the RF amplifier through a second filter (resistors 41 and 43 and capacitor 45). As the AGC voltage becomes more positive, responsive to a reduction in signal strength of the received television signal, the bias on the control grid of the first IF amplifier 152 becomes more positive, causing the tube 152 to draw more current. The increased current flow through the tube 152 causes an increased voltage drop across the impedance in the cathode circuit of the tube. Thus, the voltage at the cathode of the tube 152 becomes more positive, and this voltage is applied through an isolating resistor 166 to the first control grid 14 of the AGC tube 10. Thus, as the AGC voltage decreases (becomes more positive), the bias between the first control grid 14 and cathode 12 decreases, causing an AGC voltage to be developed below the normal, uncompensated threshold and causing more noise separated signals to be developed at the screen 16 than would be developed in the absence of the compensation.

It has been found that the vertical synchronizing signals of the composite television receiver develop a larger output signal at the screen 16 than do the horizontal synchronizing signals, so that more vertical signal than horizontal signal is cancelled at the synchronizing signal separator. In order to equalize the horizontal and vertical signals at the screen 16, a portion of the keying voltage pulse at the anode 20 is applied to the first control grid 14, by connecting a pair of voltage divider resistors 160 and 162 between the anode 20 and ground, with the first control grid 14 connected to the junction of the resistors 160 and 162 through an isolating resistor 168.

The circuit of FIGURE 4 has been built and tested and the component values used are shown on the drawing. The electron tube used for the AGC tube 10 is a type 6AS6, and the video amplifier tube 82 is the pentode section of a type 6EB8.

The AGC-noise separator circuit of FIGURE 4 is simpler than that of FIGURE 3, since the auxiliary detector diode 120 and its associated circuitry of FIGURE 3 have been eliminated. As has been pointed out, high amplitude noise signal components of a composite television signal are clipped in the video amplifier tube 82, so that a slightly smaller separator noise signal is available at the screen grid 16 of the tube 10 in the FIGURE 4 circuit than is available in the FIGURE 3 circuit.

The circuits thus far described have shown a composite television signal applied to the first control grid 14 of the AGC tube 10. A composite television signal may also be applied to the cathode 12, since it is only necessary that the signal appear between the cathode 12 and first control grid 14. A cathode driven circuit is shown in FIGURE 5, which illustrates a portion of the circuit shown in FIGURE 3, modified to show the cathode driven configuration.

Negative going composite television signals (as shown by the waveform 140) are applied from the video detector anode 74 through an isolating resistor 142 directly to the cathode 12 of the AGC tube 10. The first control grid 14 is biased to determine the conduction level of the tube 10 from a negative bias voltage source applied to the first control grid 14 through a potentiometer 144. The first control grid 14 is bypassed to ground by a capacitor 146. The remainder of the circuit connections for the AGC tube 10 are basically the same as those described with reference to FIGURE 3.

The operation of the circuit shown in FIGURE 5 is essentially the same as that described with reference to FIGURES 1, 3 and 4. Briefly, the negative going composite television signals (illustrated by waveform 140) develop an AGC voltage at the anode 20 and separated noise signals at the screen grid 16. The separated noise signals are applied through the resistor 52 and the capacitor 54 to the second control grid 18 of the AGC tube 10 and through the resistor 50 to the separator tube 108 as a noise cancelling signals for the AGC and separator tube circuits.

Having thus described the invention, what is claimed is:

1. In a television receiver having a source of composite television signal which includes synchronizing signal components and video signal components which occur, respectively, during mutually exclusive, regular recurring intervals, said composite television signal also may include noise signal components which occur randomly, a circuit for developing separated noise signals representative of the noise signal components in said composite television signal comprising, in combination: an electron tube having at least a cathode, a first control grid, a screen grid, and an anode; means for applying said composite television signal between said cathode and first control grid in such polarity that the sychronizing signal components cause a greater cathode current flow in said tube than the video signal components; a source of voltage pulses occurring in synchronism with said synchronizing signal components; means for applying said voltage pulses to said anode to develop at said anode a unidirectional voltage responsive to the amplitude of said synchronizing signal components; and noise signal load circuit means connected to said screen grid for developing separated noise signals thereacross substantially to the exclusion of signals corresponding to the video and synchronizing components of said composite television signal, said separated noise signals corresponding to noise signal components which may be present in said composite television signal that are larger in amplitude than the synchronizing signal components.

2. In a television receiver having a source of composite television signal which includes synchronizing signal components and video signal components which occur, respectively, during mutually exclusive, regular recurring intervals, said composite television signal also may include noise signal components which occur randomly, a noise protected automatic gain control circuit for developing an automatic gain control voltage representative of the strength of said composite television signal comprising, in combination: an electron tube having a cathode, a first control grid, a screen grid, a second control grid, and an anode; means for applying said composite television signal between said cathode and said first control grid in such polarity that the synchronizing signal components cause a greater cathode current flow in said tube than the video signal components; a source of voltage pulses occurring in synchronism with said synchronizing signal components; means for applying said voltage pulses to said anode to develop at said anode a unidirectional automatic gain control voltage responsive to the amplitude of said synchronizing signal components; noise signal load circuit means connected to said screen grid for developing noise signals thereacross substantially to the exclusion of signals corresponding to the video and synchronizing signal components of said composite television signal, said separated noise signals corresponding to noise signal components which may be present in said composite television signal that are larger in amplitude than the synchronizing signal components; and noise signal coupling means connected between said screen grid and said second control grid for applying said separated noise signals to said second control grid to substantially cancel the effect on the unidirectional automatic gain control voltage developed at said anode caused by noise signal components in said composite television signal.

3. In a television receiver having a source of composite television signal which includes synchronizing signal components and video signal components which occur, respectively, during mutually exclusive, regular recurring intervals, said composite television signal also may include noise signals which occur randomly, said receiver also having a synchronizing signal separator circuit for deriving the synchronizing signal components from said composite television signal, the combination comprising: an automatic gain control electron tube having a cathode, a first control grid, a screen grid, a second control grid, and an anode; means for applying said composite television signal between said cathode and first control grid in such polarity that the synchronizing signal components cause a greater cathode current flow in said tube than the video signal components; a source of voltage pulses occurring in synchronism with said synchronizing signal components; means for applying said voltage pulses to said anode to develop at said anode a unidirectional automatic gain control voltage responsive to the amplitude of said synchronizing signal components; noise signal load circuit means connected to said screen grid for developing separated noise signals thereacross corresponding to noise signal components of said composite television signal larger in amplitude than the synchronizing signal components, and substantially to the exclusion of signals corresponding to the video and synchronizing signal components of said composite television signal; noise signal coupling means connected between said screen grid and said second control grid for applying said separated noise signals to said second control grid in a polarity tending to cancel the effect on the unidirectional automatic gain control voltage developed at said anode caused by noise signal components in said composite television signal; and further noise signal coupling means connected between said screen grid and said separator circuit for applying said separated noise signals to said separator circuit in a polarity tending to cancel the effect in said separator circuit of the noise signal components of said composite television signal.

4. In a television receiver having a source of composite television signal which includes synchronizing signal components and video signal components which occur, respectively, during mutually exclusive, regular recurring intervals, said composite television signal also may include noise signal components which occur randomly, a circuit for developing separated noise signals representative of the noise signal components in said composite television signal comprising, in combination: an electron tube having at least a cathode, a control grid, a screen grid, and an anode; means for applying said composite television signal between said cathode and control grid in such polarity that the synchronizing signal components cause a greater cathode current flow in said tube than the video signal components; a source of voltage pulses occurring in synchronism with said synchronizing signal components; means for applying said voltage pulses to said anode; and noise signal load circuit means connected to said screen grid for developing separated noise signals thereacross substantially to the exclusion of signals corresponding to the video and synchronizing components of said composite television signal, said separated noise signals corresponding to noise signal components which may be present in said composite television signal that are larger in amplitude than the synchronizing signal components.

5. In a television receiver having a video detector circuit for developing a composite television signal of a first polarity and which includes synchronizing signal components and video signal components which occur, respectively, during mutually exclusive, regular recurring intervals, said composite television signal also may include noise signals which occur randomly, and also having a video amplifier circuit providing a phase reversal between input signals applied thereto and output signals derived therefrom, and further having a synchronizing signal separator circuit having a signal input circuit to which said first polarity of composite television signal is applied through said video amplifier circuit, the combination comprising: an auxiliary detector circuit for developing a composite television signal of a second polarity: an automatic gain control electron tube having a cathode, a first control grid, a screen grid, a second control grid, and an anode; means for applying said second polarity of said composite television signal between said cathode and first control grid such that the synchronizing signal components cause a greater cathode current flow in said tube than the video signal components; a source of voltage pulses occurring in synchronism with said synchronizing signal components; means for applying said voltage pulses to said anode to develop at said anode a unidirectional automatic gain control voltage responsive to the amplitude of said synchronizing signal components; noise signal load circuit means connected to said screen grid for developing separated noise signals thereacross corresponding to the noise signal components of said second polarity of composite television signal that are larger in amplitude than the synchronizing signal components, and substantially to the exclusion of signals corresponding to the video and synchronizing signal components of said composite television signal; means for applying said separated noise signals to the signal input circuit of said separator circuit in a polarity tending to cancel the effect of any noise signal components in said first polarity of composite television signal applied to the signal input circuit of said separator circuit; and further means for applying said separated noise signals to the second control grid of said automatic gain control tube in a polarity tending to cancel the effect on said automatic gain control voltage of the noise signal components of the second polarity of composite video signal applied to the first control grid of said automatic gain control tube.

6. In a television receiver having a video detector circuit for developing a composite television signal which includes synchronizing signal components and video signal components which occur, respectively, during mutually exclusive, regular recurring intervals, said composite television signal may include noise signals which occur randomly, said receiver also having a video amplifier circuit for amplifying said composite television signal to provide an amplified composite television signal, said receiver further having a synchronizing signal separator circuit to which said amplified composite television signal is applied as an input signal therefor, a circuit for developing a noise cancelling signal representative of the noise signal components in said composite television signal comprising, in combination: an automatic gain control electron tube having a cathode, a first control grid, a screen grid, a second control grid, and an anode; means for applying said amplified composite television signal between said cathode and first control grid in such polarity that the synchronizing signal components cause a greater cathode current flow in said tube than the video signal components; a source of voltage pulses occurring in synchronism with said synchronizing signal components; means for applying said voltage pulses to said anode to develop at said anode a unidirectional automatic gain control voltage responsive to the amplitude of said synchronizing signal components; and noise signal load circuit means connected to said screen grid for developing separated noise signals thereacross corresponding to noise signal components of said amplified composite television signal that are larger in amplitude than the synchronizing signal components, and substantially to the exclusion of signals corresponding to the video and synchronizing signal components of said composite television signal; signal coupling means connected between said screen grid and said second control grid to apply separated noise signals to said second control grid to cancel the effect on the unidirectional automatic gain control voltage developed at said anode caused by noise signal components in said amplified composite television signal that is applied to said first control grid; and further signal coupling means connected between said screen grid and said synchronizing signal separator circuit for applying separated noise signals to said separator circuit to cancel the effect on said separator circuit of noise signal components in said amplified composite television signal applied thereto.

7. In a television receiver having a video detector circuit for developing a negative going composite television signal which includes synchronizing signal components and video signal components which occur, respectively, during mutually exclusive, regular recurring intervals, said composite television signal may include noise signals which occur randomly, said receiver also having a video amplifier circuit for amplifying said composite television signal to provide an amplified positive going composite television signal, said receiver further having a synchronizing signal separator circuit to which said amplified positive going composite television signal is applied as an input signal therefor, a circuit for developing a noise cancelling signal representative of the noise signal components in said composite television signal comprising, in combination: an automatic gain control electron tube having a cathode, a first control grid, a screen grid, a second control grid, and an anode; means for applying said amplified positive going composite television signal to said first control grid; a source of voltage pulses occurring in synchronism with said synchronizing signal components; means for applying said voltage pulses to said anode to develop at said anode a unidirectional automatic gain control voltage responsive to the amplitude of said synchronizing signal components; noise signal load circuit means connected to said screen grid for developing separated negative going noise signals thereacross corresponding to positive going noise signal components of said amplified composite television signal that are larger in amplitude than the synchronizing signal components, and substantially to the exclusion of signals corresponding to the video and synchronizing signal components of said composite television signal; signal coupling means connected between said screen grid and said second control grid to apply separated noise signals to said second control grid to cancel the effect on the unidirectional automatic gain control voltage developed at said anode caused by noise signal components in said amplified composite television signal that is applied to said first control grid; and further signal coupling means connected between said screen grid and said synchronizing signal separator circuit for cancelling the effect on said separator circuit of noise signal components in said amplified composite television signal applied thereto.

8. In a television receiver having a video detector circuit for developing a negative going composite television signal which includes synchronizing signal components and video signal components which occur, respectively, during mutually exclusive, regular recurring intervals, said composite television signal also may include noise signals which occur randomly, said receiver further including a video amplifier circuit providing a phase reversal between input signals applied thereto and output signals derived therefrom and a synchronizing signal separator circuit having a signal input circuit to which said negative going composite television signal is applied through said video amplifier circuit, the combination comprising: an automatic gain control electron tube having a cathode, a first control grid, a screen grid, a second control grid, and an anode; means for applying said composite television signal to said cathode; a source of voltage pulses occurring in synchronism with said synchronizing signal components; means for applying said voltage pulses to said anode to develop at said anode a unidirectional automatic gain control voltages responsive to the amplitude of said synchronizing signal components; noise signal load circuit means connected to said screen grid for developing separated negative going noise signals thereacross corresponding to the noise signal components of said composite television signal that are larger in amplitude than the synchronizing signal components, and substantially to the exclusion of signals corresponding to the video and synchronizing signal components of said composite television signal; means for applying said separated negative going noise signals to the signal input circuit of said separator circuit to cancel the effect of any noise signal components in said composite television signal applied to the signal input circuit of said separator circuit; and further means for applying said separated noise signals to the second control grid of said automatic gain control tube to cancel the effect on said automatic gain control voltage of the noise signal components of the composite video signal applied to the control grid of said automatic gain control tube.

9. In a television receiver having a source of composite television signal which includes synchronizing signal components and video signal components which occur, respectively, during mutually exclusive, regular recurring intervals, said composite television signal also may include noise signal components which occur randomly, a noise protected automatic gain control circuit for developing an automatic gain control voltage representative of the strength of said composite television signal comprising, in combintation: an electron tube having a cathode, a first control grid, a screen grid, a second control grid, and an anode; means for applying said composite television signal between said cathode and said first control grid in such polarity that the synchronizing signal components cause a greater cathode current flow in said tube than the video signal components; a source of voltage pulses occurring in synchronism with said synchronizing signal components; means for applying said voltage pulses to said anode to develop at said anode a unidirectional automatic gain control voltage responsive to the amplitude of said synchronizing signal components; noise signal load circuit means connected to said screen grid for developing noise signals thereacross substantially to the exclusion of signals corresponding to the video and synchronizing signal components of said composite television signal, said separated noise signals corresponding to noise signal components which may be present in said composite television signal applied between said cathode and first control grid that are larger in amplitude than the synchronizing signal components; noise signal coupling means connected between said screen grid and said second control grid for applying said separated noise signals to said second control grid to substantially cancel the effect of the unidirectional automatic gain control voltage developed at said anode caused by noise signal componetns in said composite television signal, and a clamping diode element connected between said cathode and said second control grid to prevent the potential of said second control grid from becoming substantially more positive than the potential of said cathode.

References Cited in the file of this patent

UNITED STATES PATENTS

| | | |
|---|---|---|
| 2,632,802 | Vilkomerson | Mar. 24, 1953 |
| 2,872,512 | Massman | Feb. 3, 1959 |
| 2,891,106 | Stroh | June 16, 1959 |
| 2,920,135 | Fyler | Jan. 5, 1960 |
| 2,921,130 | Jones | Jan. 12, 1960 |

FOREIGN PATENTS

| | | |
|---|---|---|
| 781,569 | Great Britain | Aug. 21, 1957 |